(12) United States Patent
White

(10) Patent No.: US 11,401,145 B2
(45) Date of Patent: Aug. 2, 2022

(54) INTEGRATED DRIVE AND HYDRAULIC ACTUATOR UNIT

(71) Applicant: Hyster-Yale Group, Inc., Fairview, OR (US)

(72) Inventor: Andrew White, Frimley (GB)

(73) Assignee: HYSTER-YALE GROUP, INC., Fairview, OR (US)

( * ) Notice: Subject to any disclaimer, the term of this patent is extended or adjusted under 35 U.S.C. 154(b) by 441 days.

(21) Appl. No.: 16/549,813

(22) Filed: Aug. 23, 2019

(65) Prior Publication Data

US 2021/0053809 A1 Feb. 25, 2021

(51) Int. Cl.
*B66F 9/22* (2006.01)
*B66F 9/075* (2006.01)

(52) U.S. Cl.
CPC ............ *B66F 9/22* (2013.01); *B66F 9/07572* (2013.01)

(58) Field of Classification Search
CPC ................................ B66F 9/07572; B66F 9/22
See application file for complete search history.

(56) References Cited

U.S. PATENT DOCUMENTS

| | | | | |
|---|---|---|---|---|
| 2,942,679 A | * | 6/1960 | Gibson | B62B 3/0612 180/274 |
| 3,016,973 A | * | 1/1962 | Williamson | B66F 9/07572 182/14 |
| 4,615,533 A | * | 10/1986 | Sewell | B62B 3/0618 280/43.12 |
| 8,336,654 B1 | * | 12/2012 | Licon | B60K 17/043 180/65.6 |
| 9,963,330 B2 | | 5/2018 | Huether et al. | |
| 2008/0100017 A1 | * | 5/2008 | Bitter | B60G 17/005 280/124.16 |
| 2012/0269606 A1 | * | 10/2012 | Newell | B62B 3/0612 414/495 |
| 2014/0124299 A1 | | 5/2014 | Royer | |
| 2015/0096405 A1 | * | 4/2015 | Hoock | B62D 1/18 74/493 |
| 2015/0102274 A1 | * | 4/2015 | He | B62B 3/0612 254/2 C |
| 2016/0176691 A1 | * | 6/2016 | Tan | E02F 3/364 403/326 |
| 2022/0010818 A1 | * | 1/2022 | Tracy | F15B 11/10 |

FOREIGN PATENT DOCUMENTS

EP 3231765 A1 10/2017

* cited by examiner

*Primary Examiner* — Saul Rodriguez
*Assistant Examiner* — Ashley K Romano
(74) *Attorney, Agent, or Firm* — Schwabe Williamson & Wyatt

(57) ABSTRACT

A housing for a hydraulic actuator unit of a pallet truck is disclosed. The housing includes a lift motor mount for mounting a lift motor to the housing and a pump mount for mounting a hydraulic pump to the housing, and couples the pump to the lift motor when each are mounted. The housing includes a hydraulic cylinder with a cylinder rod, which is positioned based on the fluid level in the hydraulic cylinder; a reservoir to store fluid for actuation of the cylinder rod; and one or more fluid galleries that extend, internal to the housing, among the fluid reservoir, the pump mount, and the hydraulic cylinder. A traction motor mount mounts the traction motor, which is coupled to a steering unit of the pallet truck and controls actuation of a traction wheel of the pallet truck when the traction motor is mounted to the traction motor mount.

20 Claims, 16 Drawing Sheets

(«INTEGRATED DRIVE AND HYDRAULIC ACTUATOR UNIT»)

INTEGRATED DRIVE AND HYDRAULIC ACTUATOR UNIT

TECHNICAL FIELD

Disclosed embodiments are directed to lift systems for materials handling equipment, such as a forklift, pallet truck, or similarly configured vehicle. Specifically, hydraulic actuation units that may be integrated with a portion of the drive assembly of a vehicle or other materials handling equipment are disclosed.

BACKGROUND

Warehouses and similar facilities may store bulk goods of various types in a palletized fashion, where a quantity of goods are secured to a pallet. The pallets are typically configured to allow manipulation by materials handling equipment, such as a forklift or pallet truck. For example, a pallet may be configured to accept two tines of a forklift to allow for lifting and transport. Given the size of a typical pallet and potential weight and bulk of secured goods, the materials handling equipment is typically powered, both for movement of the goods as well as for handling, e.g. lifting and lowering palletized goods for loading, transport, and unloading. Absent powered equipment, the palletized goods would have to be manually pushed or pulled, typically at a speed slower than the average walking speed of a person, and hoisted or lowered by way of a manually operated jack or similar mechanism. Depending on the nature of the terrain to be traversed, e.g. ramps or other inclines, using only unpowered equipment could also drastically limit the size of load that could be handled. In contrast, employing powered materials handling equipment capable of accepting and manipulating comparatively heavy loads can improve efficiency by increasing both the speed of handling, as well as the weight of goods that can be handled.

The background description provided herein is for the purpose of generally presenting the context of the disclosure. Unless otherwise indicated herein, the subject matter described in this section is not prior art to the claims in this application and is not admitted to be prior art by inclusion in this section.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example, and not by way of limitation, in the figures of the accompanying drawings.

DETAILED DESCRIPTION

Figure 1:
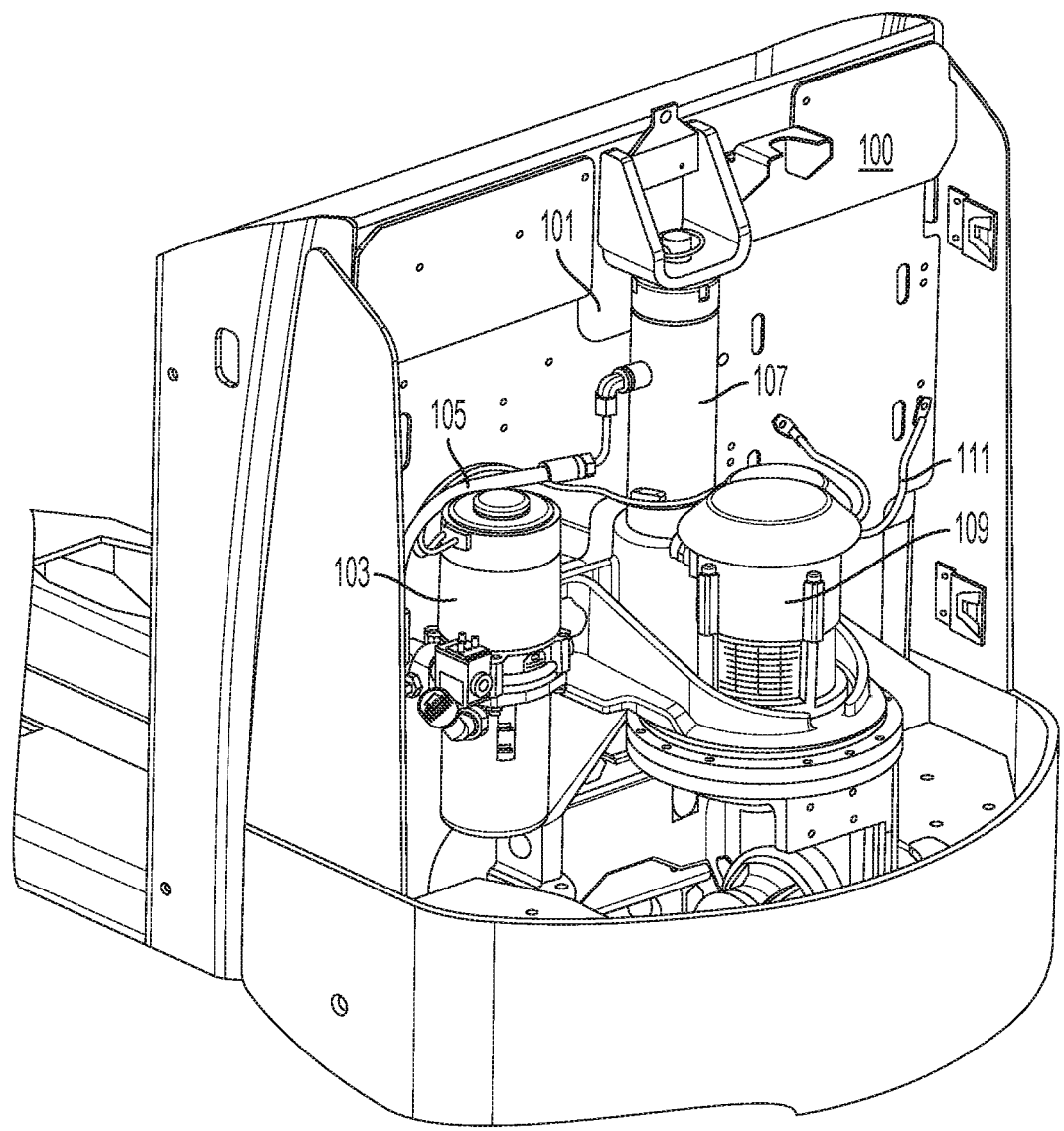
FIG. 1 illustrates a pallet truck that includes a hydraulic system of a previous approach.

In the following detailed description, reference is made to the accompanying drawings which form a part hereof wherein like numerals designate like parts throughout, and in which is shown by way of illustration embodiments that may be practiced. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents.

Aspects of the disclosure are disclosed in the accompanying description. Alternate embodiments of the present disclosure and their equivalents may be devised without parting from the spirit or scope of the present disclosure. It should be noted that like elements disclosed below are indicated by like reference numbers in the drawings.

Various operations may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiment. Various additional operations may be performed and/or described operations may be omitted in additional embodiments.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B and C).

The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

Pallet trucks are typically configured as a type of forklift, and, as suggested by the name, are useful to lift and move pallets within a warehouse. A common use of pallet trucks is to organize pallets in various situations, e.g. when using a full-size forklift would be impractical, there is insufficient clearance for a forklift to operate, there is no forklift truck availability, or use of a forklift is otherwise not desired. A pallet truck generally includes a tiller, a jack that includes two or more fork tines (or simply, "forks"), one or more steering wheels, and either a single wheel or two bogie wheels associated with each fork. The fork tines are sized and/or spaced to engage with corresponding recesses on a pallet upon which goods may be secured, or in other implementations, may be sized and/or spaced as appropriate for materials intended to be handled.

Pallet trucks typically include hydraulic components for operating the jack (among other possible functions) and frame components, which form the basic structure upon which the various operable components of a pallet truck are secured. Hydraulic systems are a relatively efficient method of transferring power, due to the essentially incompressible nature of hydraulic fluid coupled with the ability to direct fluid to arbitrary locations via flexible hoses. For example, the jack is typically coupled to a hydraulic lift system to enable the jack and attached form to be raised or lowered while supporting the weight of a pallet and associated palletized goods. In one example of a pallet truck, when the hydraulic lift system is actuated, hydraulic pressure causes lift linkages coupled to the lift system to force associated wheels coupled to each fork tine of the pallet truck down, thus causing the forks (and any load thereon) to raise upward to clear the floor, allowing the load to be maneuvered. By releasing hydraulic fluid, the lift linkages are allowed to retract, such as under the weight of the truck and load, thus lowering the pallet truck forks.

In various implementations, the hydraulic components can include a motor (typically electric), which is coupled to a hydraulic fluid pump. The pump in turn is in fluid communication with a reservoir that stores hydraulic fluid. The pump draws fluid from the reservoir and supplies it, under pressure, to various components that operate by way of hydraulic pressure, such a cylinders, actuators, and/or motors. In the case of a typical pallet truck, the fluid is supplied to at least a hydraulic cylinder, which includes a piston that extends from the cylinder and exerts a force as it extends under the pressure of the hydraulic fluid from the pump, which fills the cylinder space behind the piston. The hydraulic cylinder, in turn, can be coupled to the fork via a mechanical linkage, so that extension of the piston imparts a force to the linkage and so causes the fork to rise, lifting any goods that are supported by the fork. The mechanical linkage can vary depending upon a given truck's specific implementation. For example, some pallet trucks may connect one or more lift cylinders directly to the fork. In other example pallet trucks, one or more lift cylinders may connect to a lever that forces a bogey wheel that is pivotably attached to each fork tine against the ground, causing the fork to raise.

The hydraulic fluid is typically supplied through a valve assembly. The valve assembly can, among other functions, serve as a one-way or check valve that allows hydraulic fluid to enter the cylinder, but prevents the fluid from being forced back out from the weight of any goods placed upon the fork. Thus, the valve assembly enables the fork to maintain its lifted position without requiring the motor and pump to run continuously. To lower the fork, the valve assembly is typically either held open or switched to a reverse flow configuration, which allows the weight of the forks and/or any load upon the forks to force the piston into the cylinder as it displaces hydraulic fluid, which in turn flows back to the reservoir. Depending on the specifics of a given implementation, the valve assembly may be implemented as a single valve or as a plurality of valves, e.g. with a one-way check valve in the fluid supply line from the pump to the cylinder to effect lifting, and a second bleed or manually operated valve in a fluid return line from the cylinder to the reservoir, which is selectively opened to enable the piston to retract into the cylinder under the weight of the fork and/or load. The valve(s) may be configured to allow the flow to be varied, to enable control of lifting and/or lowering speeds. Some implementations may further include additional valves such as relief valves, which are configured to open if the hydraulic fluid exceeds a threshold pressure and drain fluid back into the reservoir, and/or recirculating valves, which allow fluid to continue to circulate and bypass the lift cylinder in the event the piston is fully extended, but the motor and pump remain energized. The relief valve can prevent damage to the hydraulic components (e.g. hose rupture, pump failure, motor burn-out), such as in the event the fork is overloaded.

In some pallet trucks, the hydraulic components are discrete from the frame components, but either directly or indirectly attach to the frame. In addition, the hydraulic components can include multiple separate components. For example, where hydraulic components are mounted at various points on a vehicle, they may be connected via one or more hoses, e.g. the reservoir and/or pump and motor may be attached at one point on the frame, and use hoses to transport hydraulic fluid to and from the lift cylinder and/or valve assembly. Having separate hydraulic and frame components, in addition to hydraulic components that are separate, can be expensive and/or can require significant assembly time and part count. Furthermore, because hydraulic fluid flow can involve flow between separate components of the hydraulic system, there can be a significant risk of leakage, such where hoses are involved.

Vehicles such as pallet trucks may further include one or more driveline components, such as a traction motor to allow for motorized transport. In some implementations, the traction motor may be powered from the hydraulic system. In other implementations, the traction motor may be separate from the hydraulic pump motor, and powered from the vehicle electrical system along with the discrete hydraulic pump motor. The traction motor is typically coupled to one or more drive wheels, which propel the vehicle in a desired direction. Depending upon the traction motor and vehicle configuration, the drive wheel(s) may be directly coupled to the motor, or may pass through a final gear drive to convert rotational speed into torque and/or to alter the direction of the rotational power. Some implementations include multiple traction motors. Further, the drive wheel(s) may be coupled to a tiller or other steering mechanism, which allows the wheel(s) to be pivoted to control the vehicle travel direction. In some such implementation, the traction motor may pivotably couple to a final gear drive, to allow the drive wheel(s) to pivot with the final drive while the traction motor is held stationary relative to the frame.

In any of the typical implementations, the various operative components, e.g. hydraulic components and driveline components, are mounted to a vehicle frame. Depending on where on the frame such components are mounted, various hoses and/or electrical cables may also be necessary to transfer and distribute power (either electrical or hydraulic) between the various components. As will be understood, each discrete component adds to vehicle weight, increasing cost, assembly time, vehicle size, and the amount of power consumed during vehicle operation.

European Patent Application No. EP3231765A1 (EP '765) is directed to an integral hydraulic system, which combines a hydraulic power unit, control unit, and action unit into a single complete assembly. The EP '765 reference includes manually actuated valves, and an integrated reservoir that is disposed between and provides attachment for a pump motor and a hydraulic pump. Internal galleries conduct hydraulic fluid from the pump to the attached lift cylinder and piston. However, the EP '765 does not provide mounting points that can allow the integral hydraulic system to be incorporated into a vehicle frame, nor does the EP '765 reference provide a mounting point for a traction motor and/or final drive.

Embodiments of integrated drive and hydraulic actuator units (variously referred to herein as "integrated hydraulic actuators" or "hydraulic actuators") that address the shortcomings of previous approaches are described herein. For example, in one embodiment, a hydraulic cylinder, reservoir, valve block, and pump motor mount of a hydraulic system of a pallet truck are combined into a single housing along with a mount for a drive motor, and potentially a final drive unit. In another embodiment, the single housing provides support for a drive unit, lift linkage and other components such that it forms the frame for the pallet truck. By combining the cylinder, reservoir, valve block, pump motor mount, and drive unit support into a single housing, and further providing support for the lift linkage and other components, the cost of the pallet truck lift system and frame can be reduced. Because the hydraulic fluid flow is internal, the potential for leaks is reduced. By including a mount for the drive system, the need for flexible cables, which may be susceptible to breaking with repeated flexing, can be minimized or even eliminated. Additionally, because there are fewer system components, assembly is straightforward. Still further, disclosed embodiments provide frame mounting points that are configured to effectively allow the integrated drive and hydraulic actuator unit to form part of the vehicle frame. This integration can allow for a simplified and potentially lighter weight vehicle frame that may be more compact, consuming less room and potentially allowing maneuverability in tighter spaces than existing vehicles.

Although the embodiments disclosed herein are described with respect to a pallet truck, this is for example only, and not intended to be limiting. It should be understood that various embodiments may be used with a variety of different types of vehicles, such as other materials handling vehicles, e.g. forklifts, platform pallet trucks, platform stacker trucks, etc. Further still, some embodiments may be used with other types of suitable vehicles that employ a hydraulic system, e.g., farm implements, construction equipment, industrial equipment, etc. Disclosed embodiments may also include non-vehicle implementations, e.g. factory equipment that employs a hydraulic system such as a press or compactor.

FIG. 1 illustrates a pallet truck that includes a frame and hydraulic subassembly 100 of a previous approach. The frame and hydraulic subassembly includes frame 101, hydraulic unit 103, one or more connecting hoses 105, hydraulic lift cylinder 107, drive motor 109, and one or more power cables 111.

Referring to FIG. 1, a shortcoming of the frame and hydraulic subassembly 100 is that it includes an excessive number of separate parts. For example, the frame and hydraulic subassembly 100 includes a separate mounting frame and hydraulic unit. Moreover, the hydraulic portion of the subassembly itself includes separate components. For example, the hydraulic unit 103 and the cylinder 107 are separate components that are connected by one or more connecting hoses 105.

In addition, because the hydraulic unit 103 and the steering unit are separate, steering involves the flexing of the power cables 111. The requirement that the power cables 111 flex with steering decreases the reliability of the power cables 111. The use of separate components can be expensive and can require significant assembly time and part count. As such, assembly can be complicated. Furthermore, because hydraulic fluid flow can involve flow between separate components of the hydraulic system there can be a significant risk of leakage. For example, the joints that connect such components can be leakage prone.

In contrast, FIGS. 2A-2H include views of a pallet truck 200 (FIG. 2A) that includes various embodiments of an integrated frame and hydraulic actuator 220, that is used in the pallet truck 200 (FIGS. 2B-2D), and the hydraulic actuator 220 installed in the pallet truck 200 (FIGS. 2E-2H). The integrated hydraulic actuator 220, as can be seen in the various figures, provides a single assembly which can both integrate into the frame of pallet truck 200, thus saving space and weight, and also provides mount points for both the hydraulic pump, hydraulic pump motor, drive or traction motor, and final drive. The hydraulic actuator 220 further can provide a mount and pivot point through which a steering tiller, mechanically coupled to a drive wheel, may pass. As the hydraulic actuator 220 can form part of the frame, the steering tiller is properly secured to the frame of pallet truck 200 by mounting to the hydraulic actuator 220.

Figure 2A:
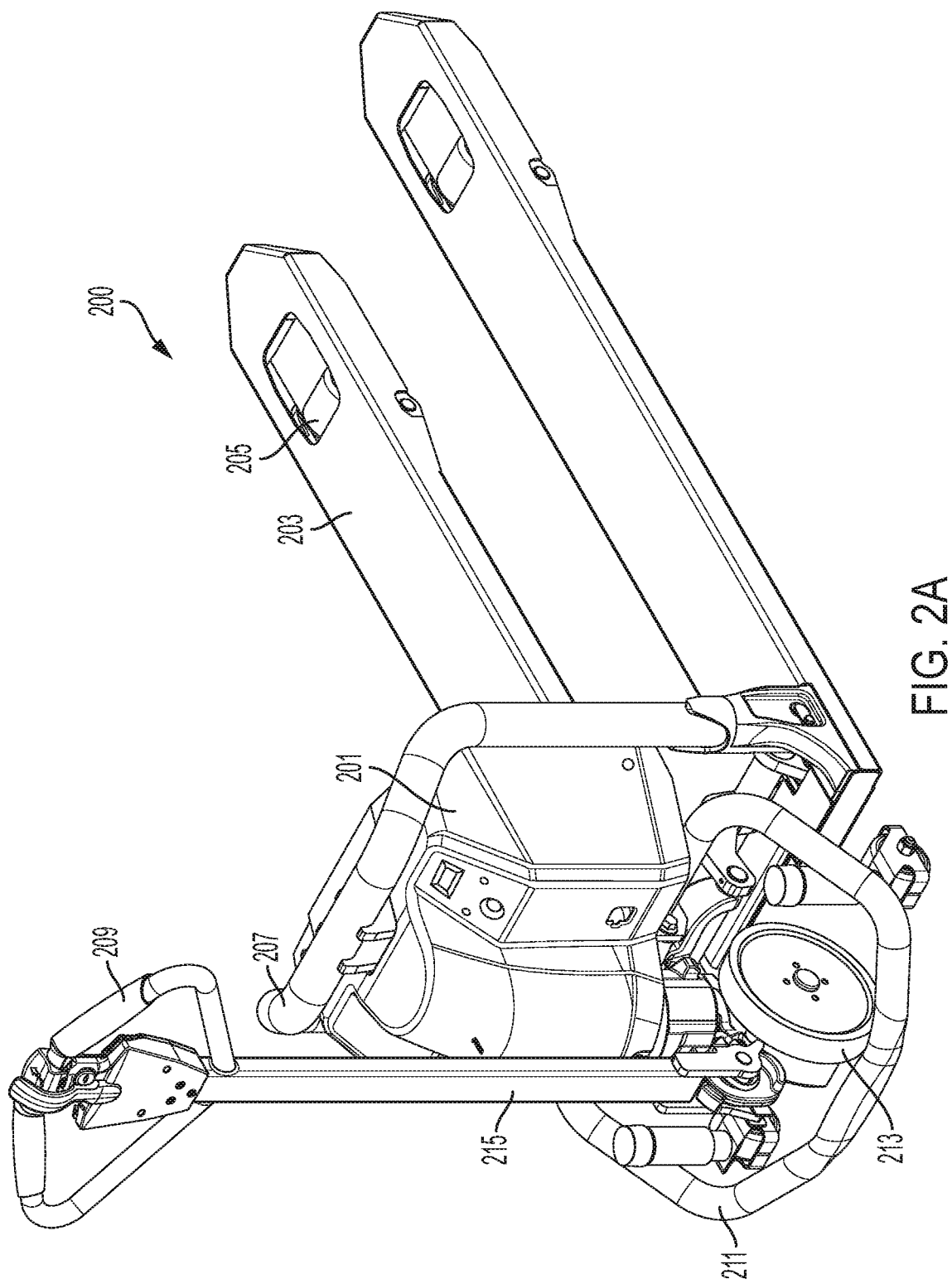
FIG. 2A illustrates a pallet truck that includes an integrated hydraulic actuator and truck frame assembly according to an embodiment.

In FIG. 2A, the pallet truck 200 includes an integrated hydraulic actuator 220 and truck frame assembly. The pallet truck 200 includes, among other components, body 201, one or more forks 203, wheels 205, frame 207, operating handle 209, support frame 211, driving wheel 213, and steering tiller 215. The body 201 may be connected to the frame 207 and may cover the hydraulic actuator and other internal components of the pallet truck 200. The forks 203 may be coupled to the frame 207 and, as depicted in FIG. 2A, may comprise two tines configured to engage with a pallet or other materials to be handled. The wheels 205 may include one or more wheels movably or rotatably connected to the forks 203. The support frame 211 may be connected to an integrated hydraulic actuator housing 220 (as described below with reference to FIG. 2B). The operating handle 209 may be connected to the driving wheel 213 via the steering tiller 215 and may be used to operate the pallet truck 200.

Figure 2B:
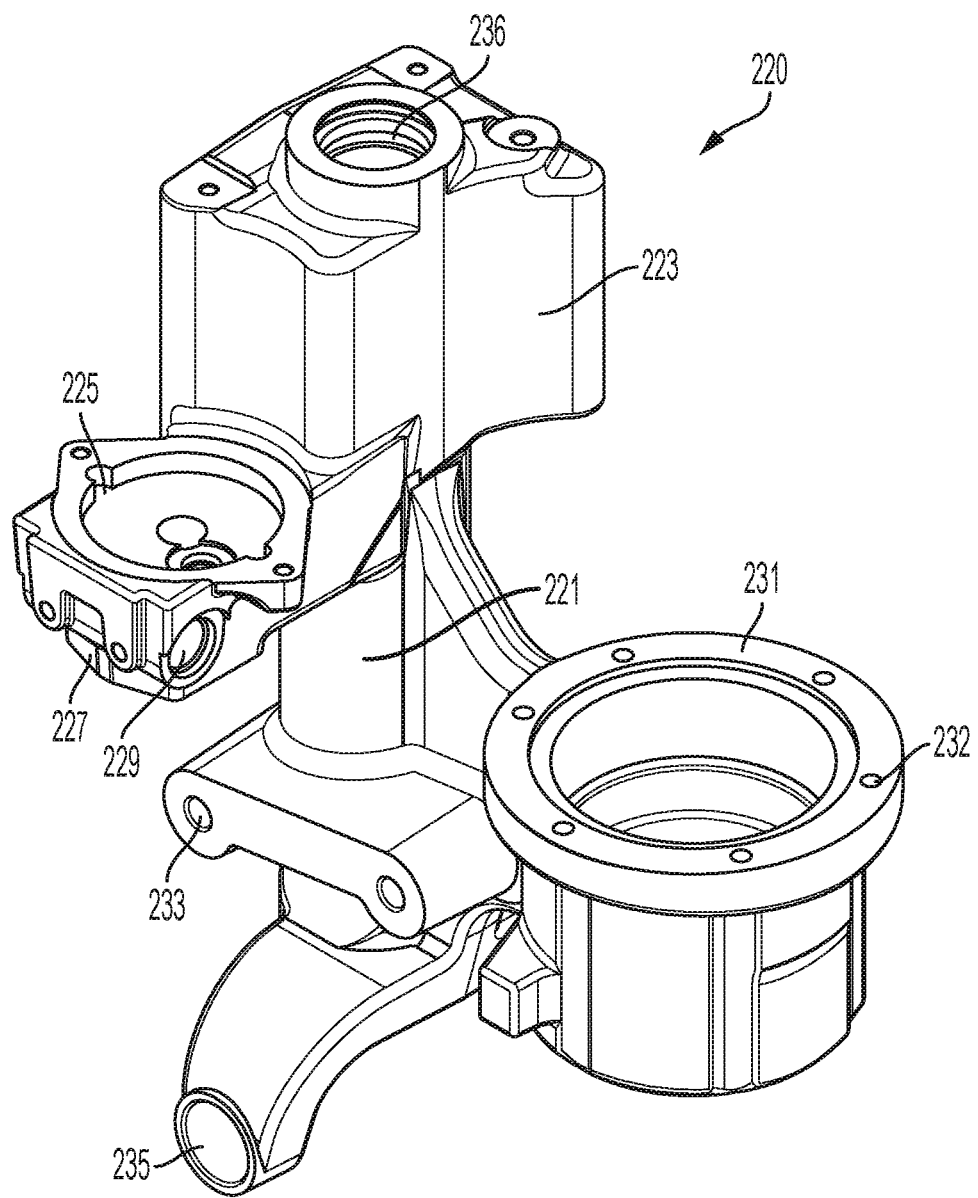
FIG. 2B illustrates an example integrated hydraulic actuator housing structure that can be used in the pallet truck of FIG. 2A according to an embodiment.
Figure 2C:
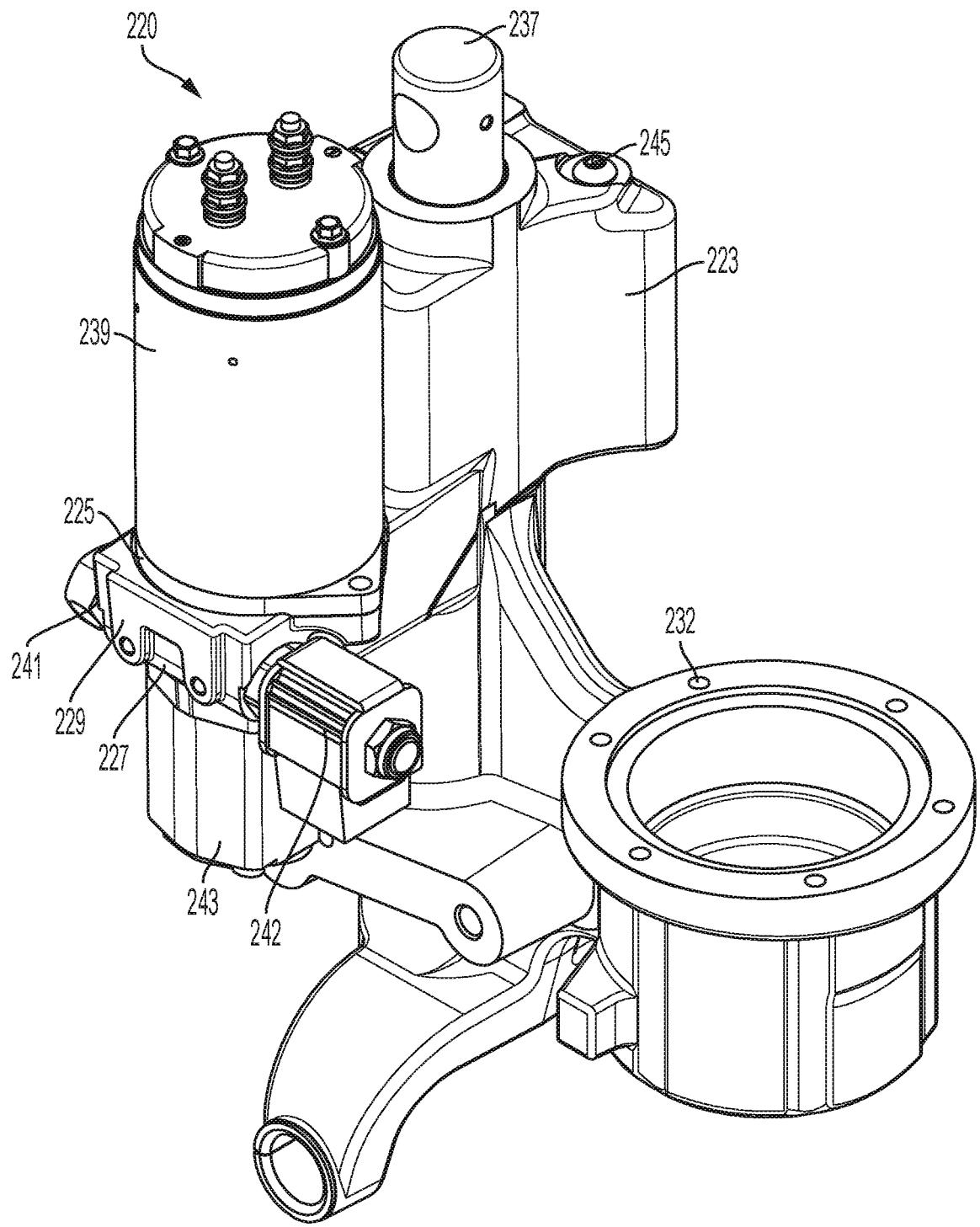
FIG. 2C illustrates the hydraulic actuator housing structure shown in FIG. 2B with hydraulic components connected.
Figure 2D:
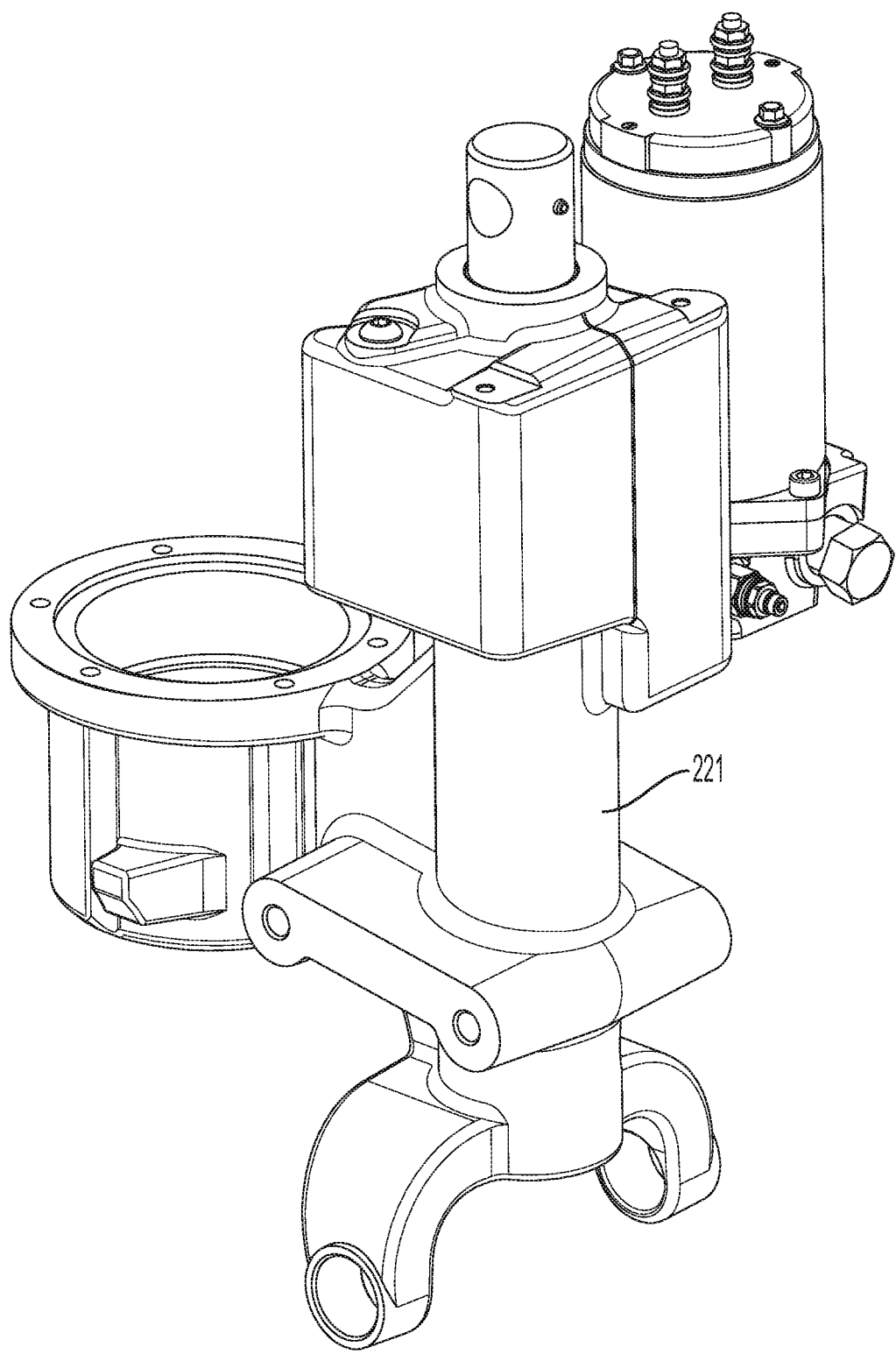
FIG. 2D illustrates an opposite side view of the example integrated hydraulic actuator and truck frame subassembly of FIG. 2C according to an embodiment.

FIGS. 2B-2D illustrate an example hydraulic actuator housing 220 that may be used in the pallet truck 200 of FIG. 2A.

As illustrated in FIG. 2B, the depicted hydraulic actuator housing 220 may house a cylinder 221 (shown in FIG. 2E) that includes a lift cylinder chamber 236 through which a cylinder rod 237 travels, internal fluid reservoir 223, lift motor mount 225, pump mount 227, and valve mount 229. Moreover, as shown in FIG. 2B, the hydraulic actuator housing 220 may additionally include a traction motor mount 231, support frame connector 233, and lift linkage connection 235. The traction motor mount 231 can include a plurality of recesses or apertures 232. The recesses 232 may be configured to receive fasteners from a traction motor that attach the traction motor to the traction motor mount 231. In other embodiments, other manners of attaching a traction motor to the traction motor mount 231 can be used. The support frame connector 233 may be used to connect the support frame 211 to the hydraulic actuator housing 220, to secure the actuator housing 220 into place on the pallet truck 200. By connecting the hydraulic actuator housing 220 to the support frame 211, the hydraulic actuator housing 220 effectively becomes part of the support frame 211. As with the traction motor mount 231, the hydraulic actuator housing 220 can be secured to the support frame 211 using any means or mechanism of attachment that allows it to be integrated as part of the frame of the pallet truck 200 to provide necessary frame rigidity and stability. The fluid reservoir 223 may be configured to store fluid for actuation of the cylinder rod 237. In addition, the hydraulic actuator housing 220 may have one or more fluid galleries that extend, inside of the hydraulic actuator housing 220, into the fluid reservoir 223, the pump mount 225, and the lift cylinder chamber 236 of cylinder 221, as is described below with reference to FIGS. 4A-4G.

FIG. 2C illustrates the hydraulic actuator housing 220 shown in FIG. 2B with hydraulic components connected. It should be appreciated that, in an embodiment, the hydraulic actuator housing 220 may be the housing for all, or substantially all, hydraulic components. The hydraulic components shown in FIG. 2C include cylinder rod 237, lift motor 239, valves 241, pump 243, and fill port 245. The lift motor mount 225 may be configured to mount the lift motor 239. The pump mount 227 may be configured to mount the pump 243. The valve mount 229 may be configured to mount the valves 241 in recesses that may be located between the lift motor mount 225 and the pump mount 227. The valves 241 may be non-return valves, lower valves, and/or pressure relief valves located along the one or more fluid galleries as described below with reference to FIGS. 4A-4G.

The cylinder rod 237 can be positioned based on the amount of fluid that is within the lift cylinder chamber 236. The hydraulic actuator housing 220 may be formed by casting with at least a portion of the one or more fluid galleries, described below, formed during a casting process. FIG. 2D illustrates an opposite side view of the example hydraulic actuator housing 220 of FIG. 2C.

Figure 2E:
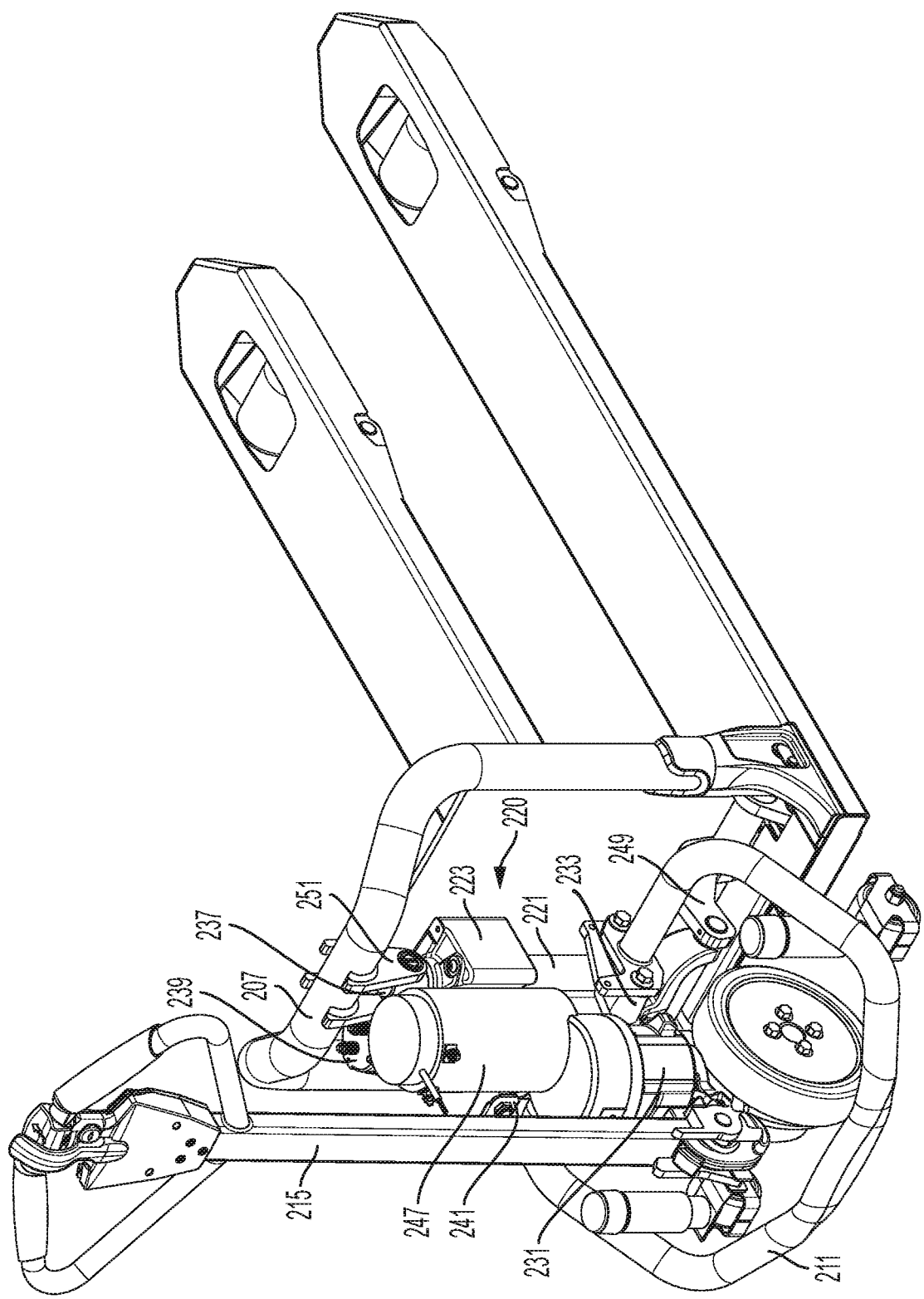
FIG. 2E illustrates a first perspective view of components of a fully assembled integrated hydraulic actuator housing and truck frame assembly installed on a pallet truck according to the embodiment of FIG. 2C.
Figure 2F:
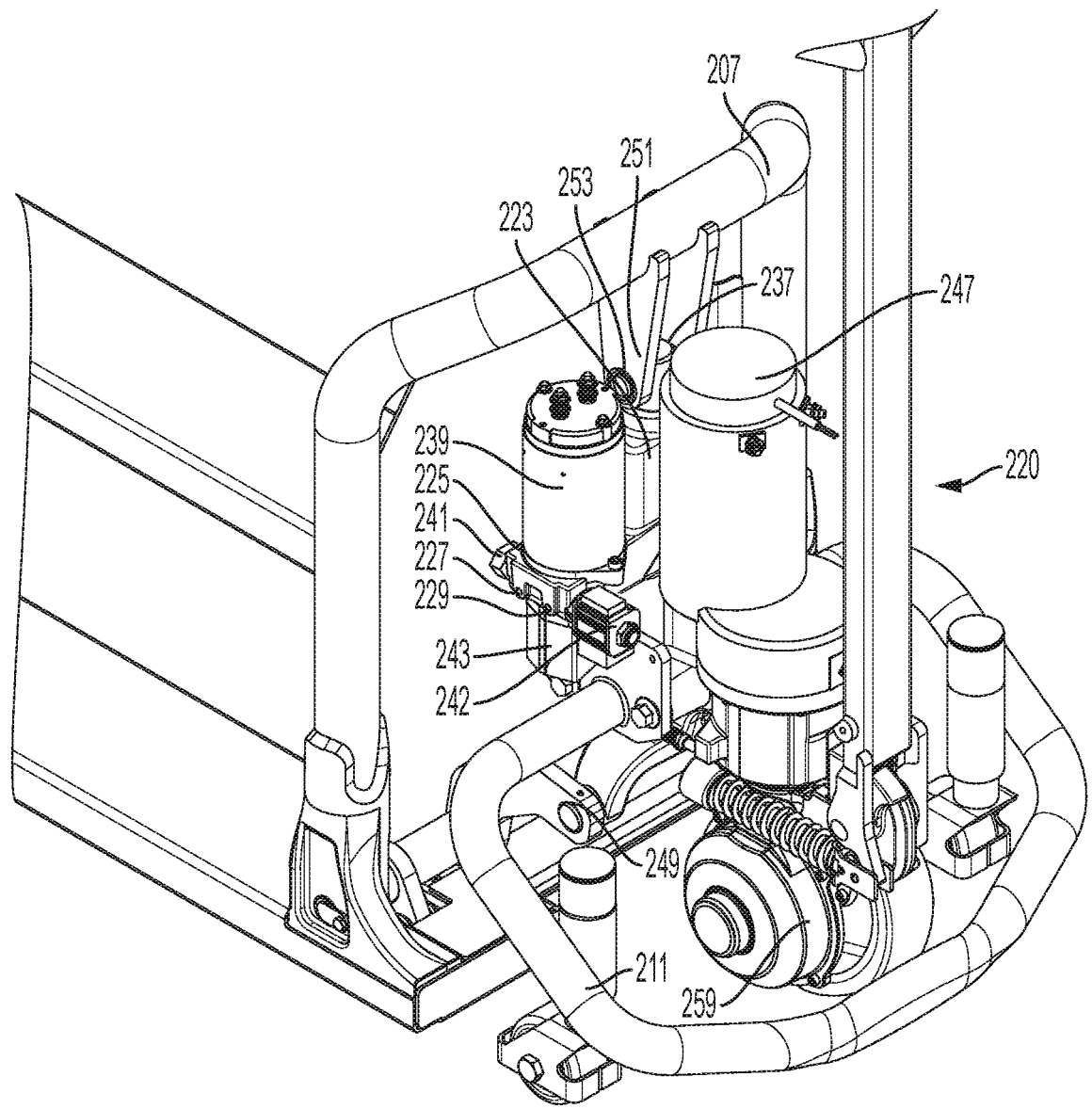
FIG. 2F illustrates a second perspective view of components of a fully assembled integrated hydraulic actuator housing and truck frame assembly installed on a pallet truck according to the embodiment of FIG. 2E.

FIGS. 2E and 2F illustrate first and second perspective views of components installed on the pallet truck 200 according to an embodiment. FIG. 2E shows a frame assembly with the hydraulic actuator housing 220 installed. As can be seen, hydraulic actuator housing 220 includes the cylinder 221, the internal fluid reservoir 223, the lift motor mount 225 (visible in FIG. 2F), the pump mount 227 (visible in FIG. 2F), and the valve mount 229 (visible in FIG. 2F). Moreover, FIG. 2E shows the hydraulic actuator housing 220 with the traction motor 247 mounted on the traction motor mount 231, the lift pump motor 239 mounted on the lift motor mount 225 (visible in FIG. 2F), and providing support for the fork frame 207, the support frame 211, the steering tiller 215, and lift linkage 249.

Referring to FIG. 2E, the reservoir 223 may be a part of the upper portion of the actuator housing 220 and may surround cylinder rod 237. The traction motor 247 may be coupled to a steering unit (described below with reference to FIG. 2H) of the pallet truck 200 and may be configured to control actuation of a traction wheel of the pallet truck in operation. The traction motor mount 231 may include steer bearing mounts for mounting steer bearings (not illustrated) to the actuator housing 220. The steer bearings allow at least a portion of a steering unit to be rotated relative to the actuator housing 220 while the traction motor mount 231 maintains the position of the traction motor 247 relative to the actuator housing 220. The steering tiller 215 may be coupled to hydraulic actuator housing 220 via the steering unit that may be coupled through the bottom of traction motor mount 231.

As shown in FIG. 2E, the hydraulic actuator housing 220 may be configured to support the fork frame 207, the rear support frame 211, and the lift linkage 249. In this manner the hydraulic actuator housing 220 may form a part of an integrated frame structure, that includes rear support frame 211 and fork frame 207, of the pallet truck 200. In particular, the fork frame 207 may be coupled to the hydraulic actuator housing 220 by fork frame linkage 251, the support frame 211 may be coupled to the hydraulic actuator housing 220 by support frame mount 233 (shown in FIG. 2B), and the lift linkage 249 may be coupled to the hydraulic actuator housing 220 by the lift linkage connection 235 (also shown in FIG. 2B). As can be further seen in FIG. 2E, fork frame 207 is also connected to lift linkage 249, and thus also connects to hydraulic actuator housing 220 via lift linkage 249 and lift linkage connection 235.

The integration of the hydraulic actuator housing 220 with the pallet truck 200 frame structure, as opposed to other parts of the pallet truck such as the steering unit, eliminates the need for power cables that flex with steering. The elimination of the need for power cables that flex with steering can improve the reliability of the power cables. Moreover, the integration of the hydraulic actuator housing 220 into the pallet truck 200 frame structure can significantly reduce cost, assembly time and part count. Furthermore, because oil galleries may be integrated into the hydraulic actuator housing 220, the need for external hoses can be reduced or eliminated. Consequently, the risk of leakage may be considerably reduced.

FIG. 2F illustrates a second perspective view of components of an integrated hydraulic actuator and truck frame assembly installed on the pallet truck 200. FIG. 2F shows in addition to the components described with reference to FIG. 2E, pump 243 and cylinder rod 237 (partially visible). Moreover, FIG. 2F shows a more complete view of the lift pump motor 239. Referring to FIG. 2F, the pump 243 may be mounted underneath the lift pump motor 239, and the lift pump motor 239 may correspondingly be adjacent to the reservoir 223. The valve 241 may be mounted in the valve mount 229.

Figure 2G:
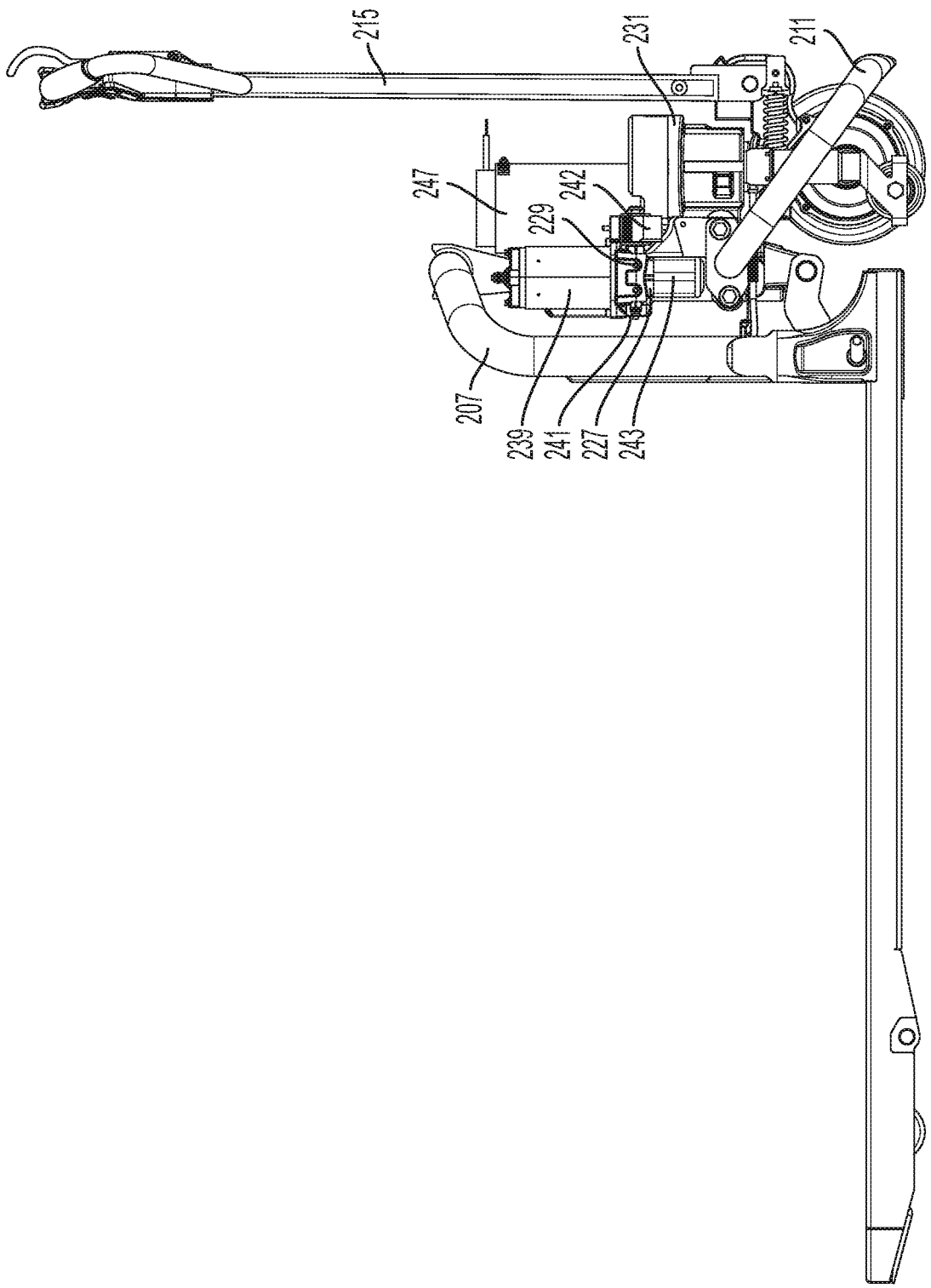
FIG. 2G illustrates a side view of a pallet truck that includes a fully assembled integrated hydraulic actuator housing and truck frame assembly installed on the pallet truck according to the embodiment of FIG. 2E.

FIG. 2G illustrates a side view of the pallet truck 200 that includes the integrated hydraulic actuator housing 220 and pallet truck 200 frame structure. Referring to FIGS. 2F and 2G, the lift pump motor 239 extends in front of and to the side of traction motor 247. The traction motor 247 is mounted on the traction motor mount 231 which extends below the pump mount 227. The valves 241 and 242 are mounted in the valve mount 229 between the lift pump motor 239 and the pump 243 where valve 241 extends into the valve mount 229 from a first side of the valve mount 229 and valve 242 extends into the valve mount 229 from a second side of the valve mount 229.

Figure 2H:
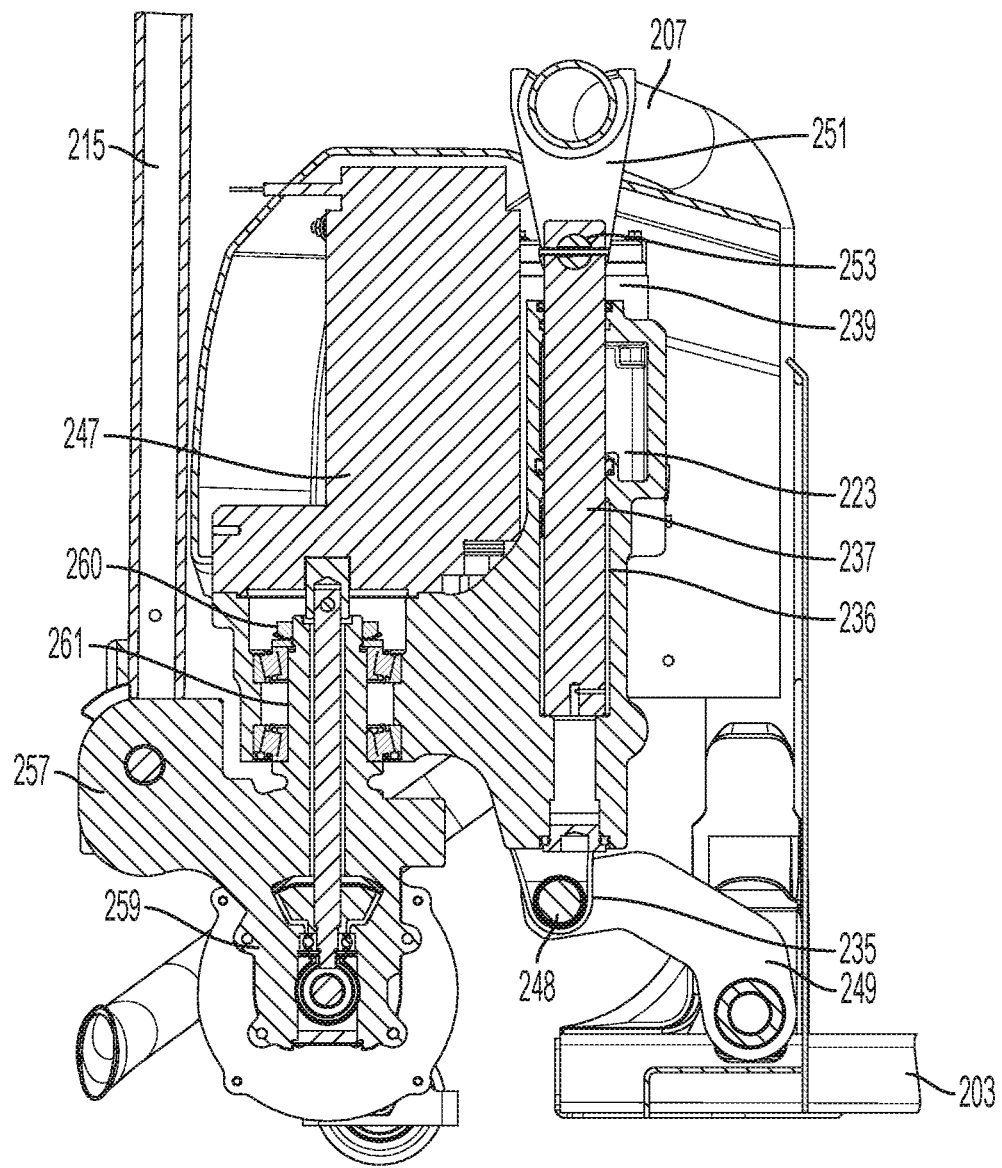
FIG. 2H illustrates a cross-sectional view of a portion of the pallet truck through the integrated hydraulic actuator housing and truck frame according to the embodiment of FIG. 2E.

FIG. 2H illustrates a cross-sectional view of a portion of the pallet truck 200 through the integrated hydraulic actuator housing 220 and truck frame. In particular, FIG. 2H shows a cross-sectional view of the steering tiller 215, lift cylinder chamber 236, fluid reservoir 223, linkage connector recess 235, cylinder rod 237, lift motor 239, cylinder seals and bearings, traction motor 247, lift linkage 249, and linkage connector 248, fork frame linkage 251, fork frame connector 253, steering unit 257, final drive 259, drive aperture 260 and steer bearings 261. FIG. 2H illustrates the internal structure and interrelationships of components of the integrated hydraulic actuator housing and truck frame.

Referring to FIG. 2H, the cylinder rod 237, cylinder seals and bearings, the lift motor 239, the valves (241 in FIG. 2C), and the pump (243 in FIG. 2C), are coupled to the hydraulic actuator housing 220. Moreover, the fluid reservoir 223, fluid galleries (see FIGS. 4A-4J), and lift cylinder chamber 236 are a part of the hydraulic actuator housing 220. It should be appreciated that the integration of the fluid reservoir 223 and the fluid galleries into the hydraulic actuator housing 220 in this manner eliminates external hoses that may be required for hydraulic systems of previous approaches. This can reduce the risk of leakage that may result from wear or damage to the external hoses as compared to the hydraulic systems of previous approaches. Furthermore, the integration of the components of the hydraulic actuator using a single hydraulic actuator housing 220 may reduce production cost, assembly time, and/or part count of the hydraulic system as compared to previous hydraulic systems.

As shown in FIG. 2H, the cylinder rod 237 is configured to extend upward from the lift cylinder chamber 236 and may be connected to the fork frame 207 by frame linkage 251. The lift linkage connector 248 connects the hydraulic actuator housing 220 to the lift linkage 249 that is connected to the fork lifts 203. A lift linkage aperture or recess (referred to as "link linkage aperture 235") may be formed within a portion of the hydraulic actuator housing 220 near the bottom of the structure. The link linkage aperture 235 may be configured to receive/engage the lift linkage connector 248 of the lift linkage 249 of the pallet truck 200.

The drive aperture 260 may be formed as a part of the final drive 259 that is configured to be removably coupled to the hydraulic actuator housing 220 underneath the traction motor 247 near a bottom portion of the pallet truck 200. The drive aperture 260 may be configured to receive drive components of a final drive 259 of the pallet truck 200. In particular, a drive component of the final drive 259 may extend upwards within the drive aperture 260 and engage the traction motor 247. Steer bearings 261 may be mounted to sidewalls along the drive aperture 260. The steer bearings 261 may engage with the drive component of the final drive and facilitate rotation of the drive component within the drive aperture 260. As mentioned above, a final drive 259 may be configured to rotate relative to the traction motor 247. Thus, traction motor 247 remains stationary relative to the hydraulic actuator 220 and frame, while imparting rotational motion to final drive 259, which can pivot and/or caster as the tiller 215 of the pallet truck 200 is manipulated. A drive wheel mounted to the final drive 259 likewise pivots with the final drive 259, to effect steering of the pallet truck 200.

A plurality of recesses or apertures (232 in FIG. 2B) as described herein with reference to FIG. 2B, may be formed in the portion of the hydraulic actuator housing 220 that encircles the drive aperture 260 (traction motor mount 231). The recesses (232 in FIG. 2B) may receive fasteners, e.g. bolts, screws, rivets, etc., from the traction motor 247 and may be utilized to attach the traction motor 247 to the traction motor mount 231 above the drive aperture 260. In other embodiments, other suitable manners of securing the traction motor 247 to the hydraulic actuator housing 220 can be used. When mounted, the traction motor 247, through engagement with components of the final drive 259, may provide an actuation force for a traction device (such as a drive wheel) of the pallet truck 200.

As shown in FIG. 2H, the steering tiller 215 may be connected to the steering unit 257. The steer bearings 261 may be mounted in the hydraulic actuator housing 220. In an embodiment, the hydraulic actuator housing 220 may be formed of metal, and may be shaped via a casting process. The casting of hydraulic actuator housing 220 can include one or more extrusions, apertures, and/or recesses that may be formed during the casting process and/or after the casting process (such as drilling of apertures and/or recesses in the casting structure). For example, one or more oil galleries such as is described herein may be formed during the casting process.

Figure 3B:
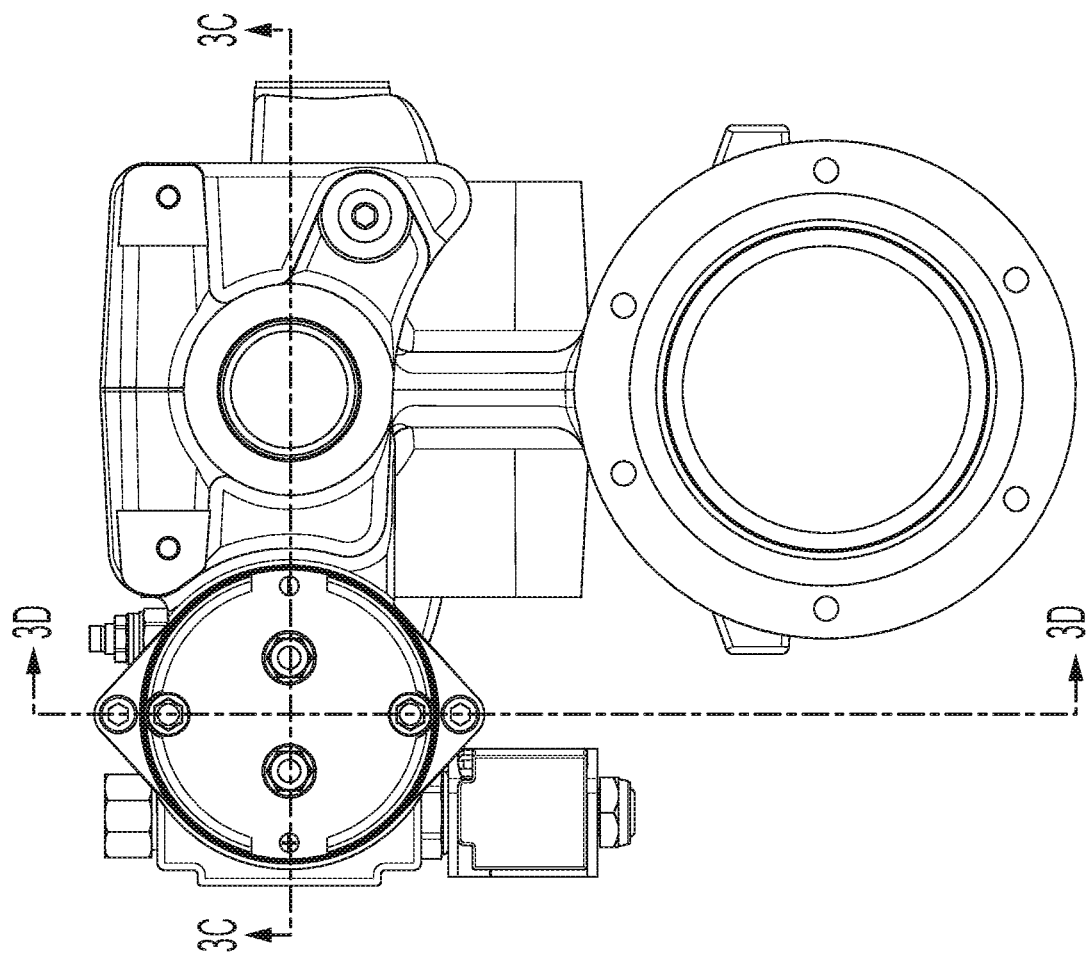
FIG. 3B shows a top view of a hydraulic actuator casting with pump and lift pump motor attached according to the embodiment of FIG. 3A.
Figure 3A:
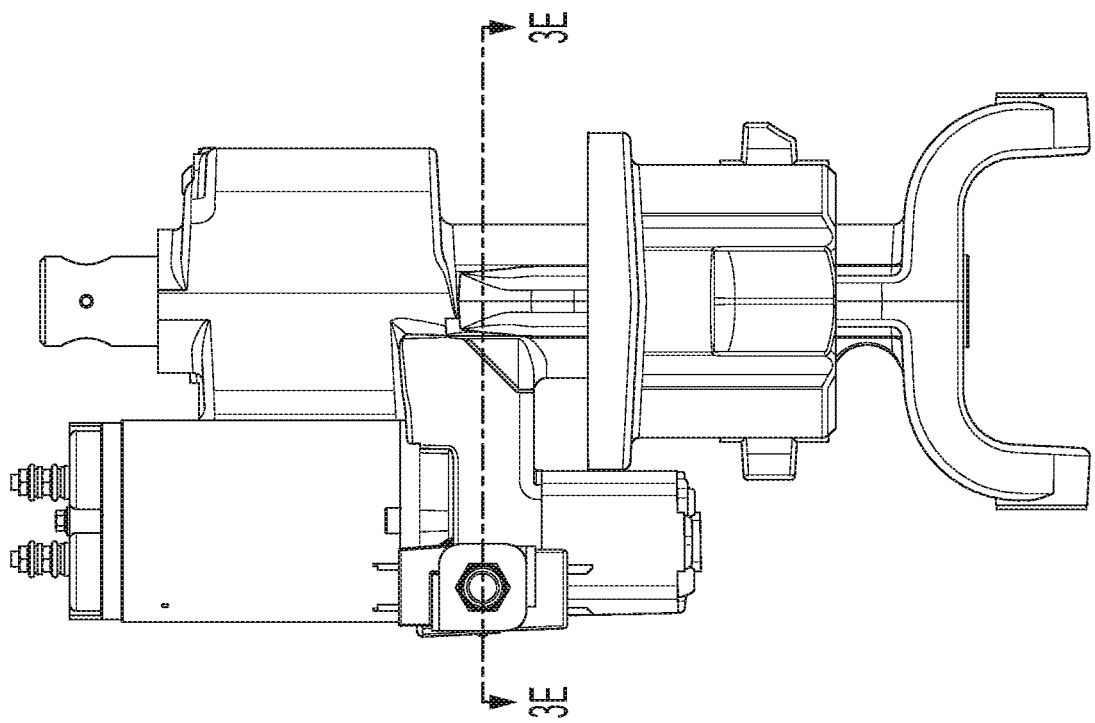
FIG. 3A shows a side view of a hydraulic actuator casting with pump and lift pump motor attached according to an embodiment.

FIGS. 3A and 3B show side and top views of the hydraulic actuator housing 220 with pump and lift pump motor attached according to an embodiment. FIG. 3A shows cut-line CC through oil galleries of the hydraulic actuator as viewed from a side of the hydraulic actuator.

FIG. 3B shows the position of cutline A-A through the center of the pump motor and the cylinder rod and the position of a cutline B-B perpendicular to the cutline A-A through the center of the pump motor as viewed from the top of the hydraulic actuator.

Figure 3C:
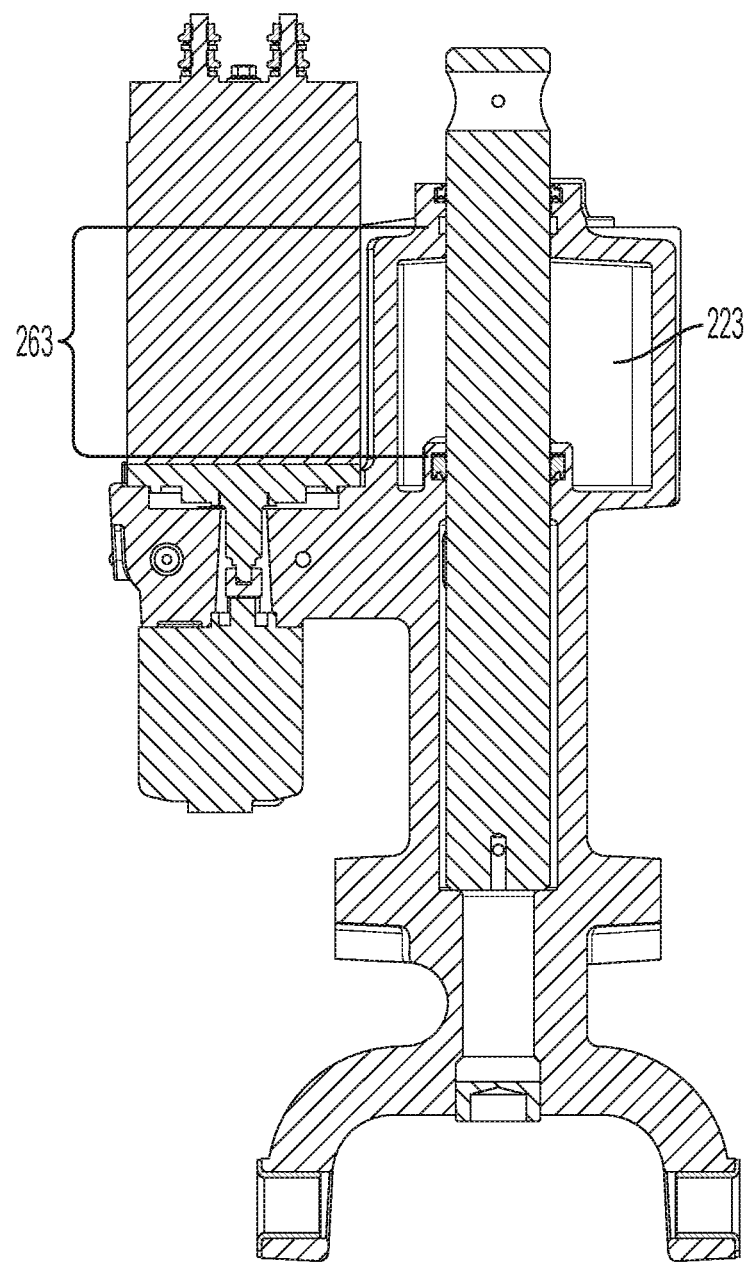
FIGS. 3C-3E show cross-sections of the example integrated hydraulic actuator corresponding to cutlines A-A, B-B and C-C respectively.
Figure 3E:
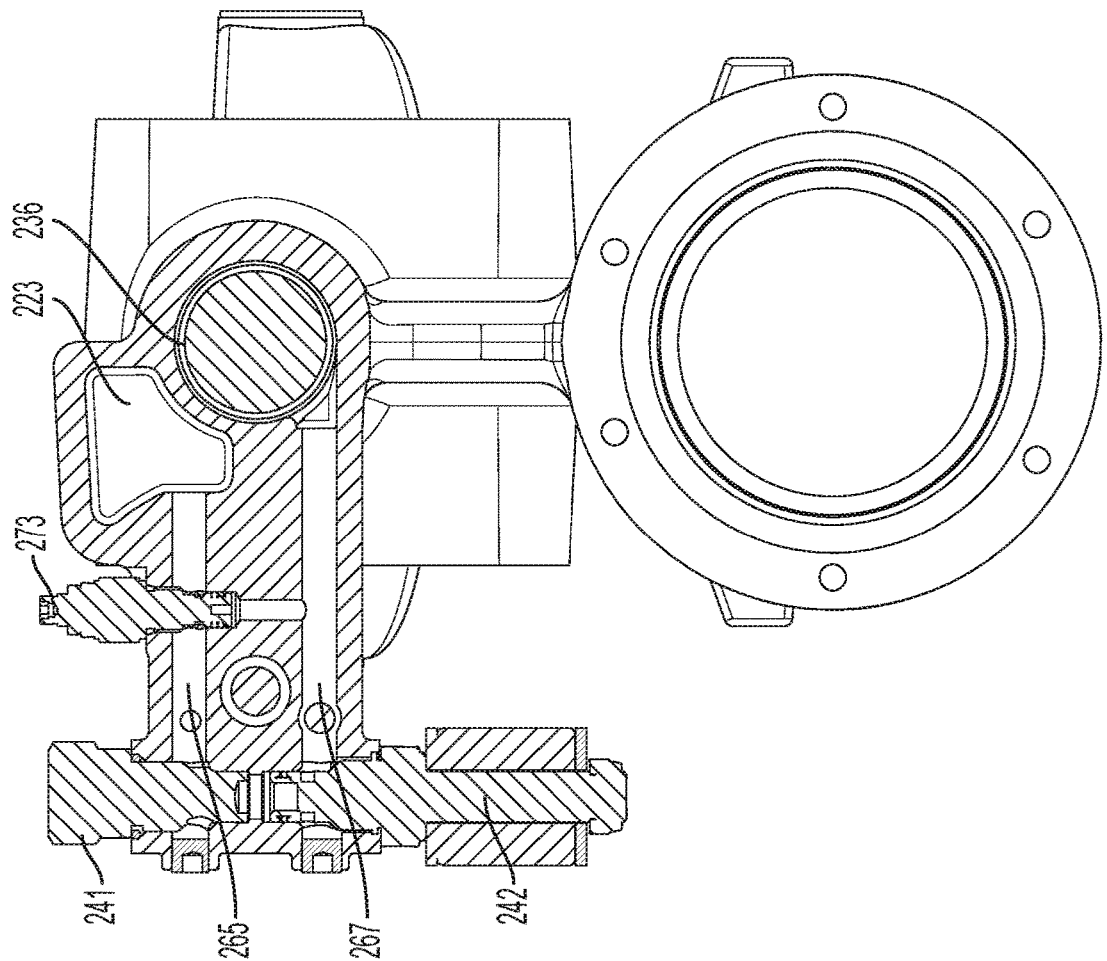
Figure 3D:
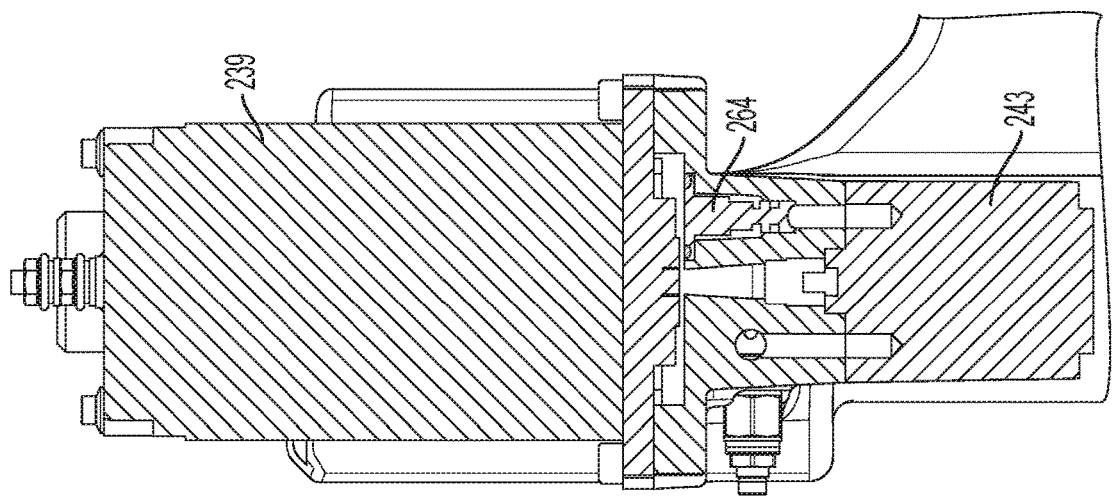

FIGS. 3C-3E show cross-sections of components of the example hydraulic actuator corresponding to cutlines A-A, B-B and C-C respectively. Referring to FIG. 3C, in addition to structures previously described, FIG. 3C shows a cross-section of cylinder seals and bearings 263. FIG. 3D shows cross-sections of lift motor 239 and pump 243 and none return valve 264. FIG. 3E shows cross-sections of fluid reservoir 223, gallery 265, gallery 267, flow control valve 241, lower control valve 242, and pressure relief valve 273.

Operation

FIGS. 4A-4J illustrate lifting, full lift, hold and lowering operations of the hydraulic actuator 220. These operations are described with reference to cross-sections of the components of the hydraulic actuator 220 shown in FIGS. 3C-3E.

Lifting

Figure 4C:
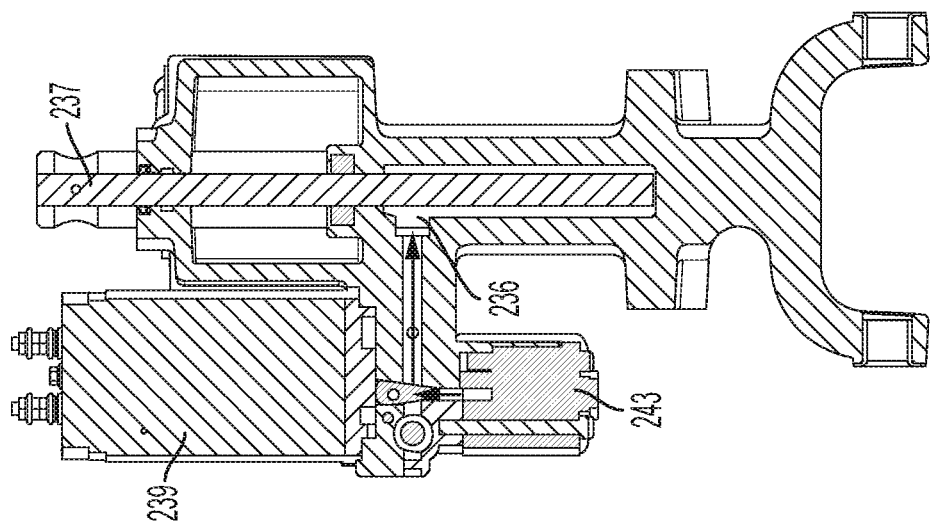
FIGS. 4A-4J illustrate example lifting, full lift, hold and lowering operations that may be carried out with an example integrated hydraulic actuator, according to various embodiments.
Figure 4B:
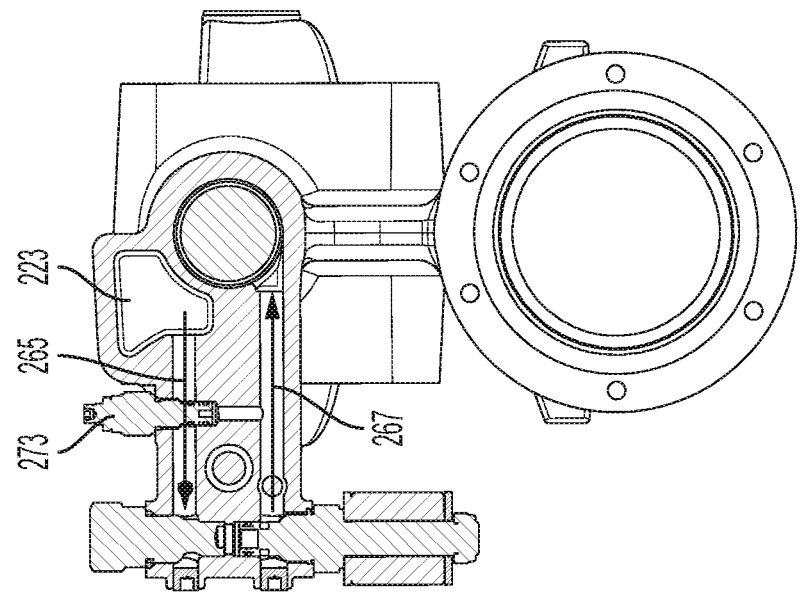
Figure 4A:
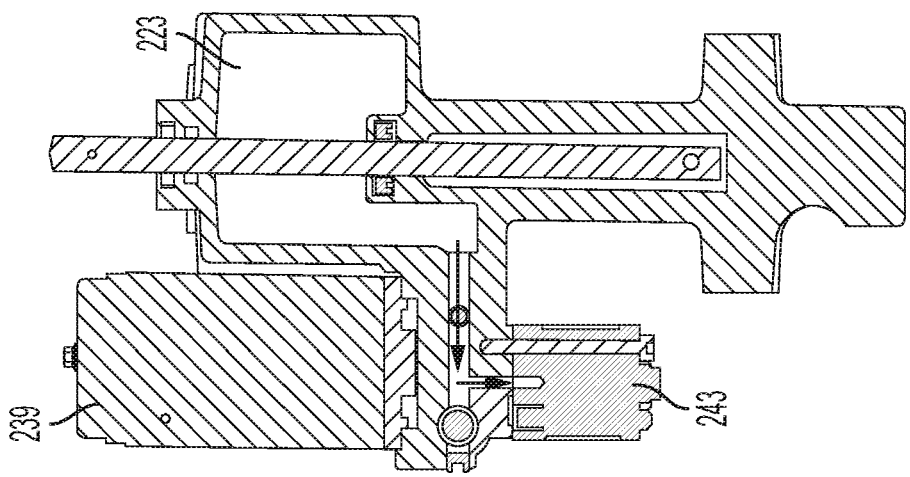

FIGS. 4A-4C illustrate the lifting operation of the hydraulic actuator. Referring to FIG. 4A, upon a command to lift, power is supplied to the lift pump motor 239. This causes the hydraulic fluid contained in reservoir 223 to be drawn along the internal oil gallery 265, as shown in FIG. 4B, and into the pump 243, as shown in FIG. 4A. The pump 243, driven by the pump motor 239, pressurizes both the oil gallery 267 and the lift cylinder chamber 236 as shown in FIGS. 4B and 4C. The pressure that is formed in the lift cylinder chamber 236 causes the lift cylinder rod 237 to lift. The pressure relief valve 273 may be set at a level sufficient to prevent a load above the rated maximum load from being lifted and an over-pressure condition within the unit.

Full Lift

Figure 4D:
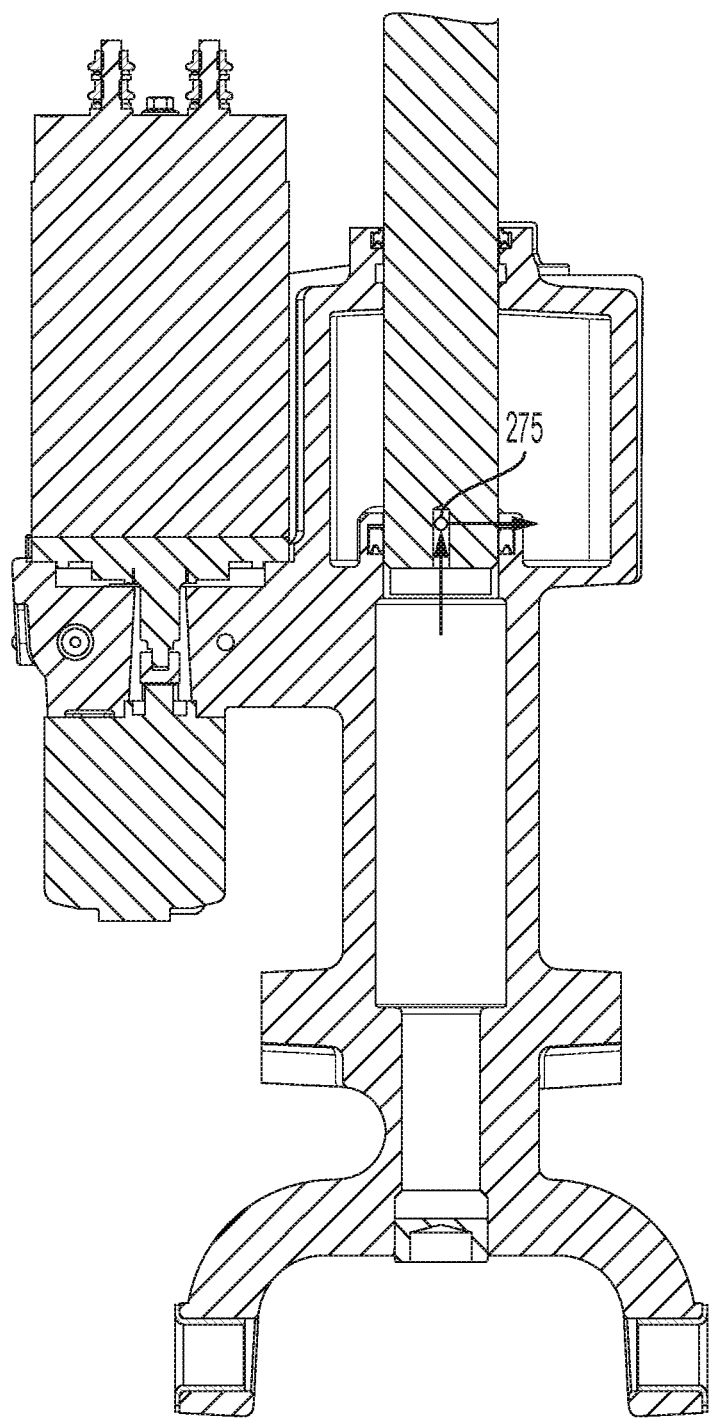

FIG. 4D illustrates a full lift operation of the hydraulic actuator. Referring to FIG. 4D, at maximum lift height, a by-pass port 275 in the lift cylinder rod 237 allows lift pressure to disperse into the reservoir thereby preventing further lift.

Load Holding

Figure 4G:
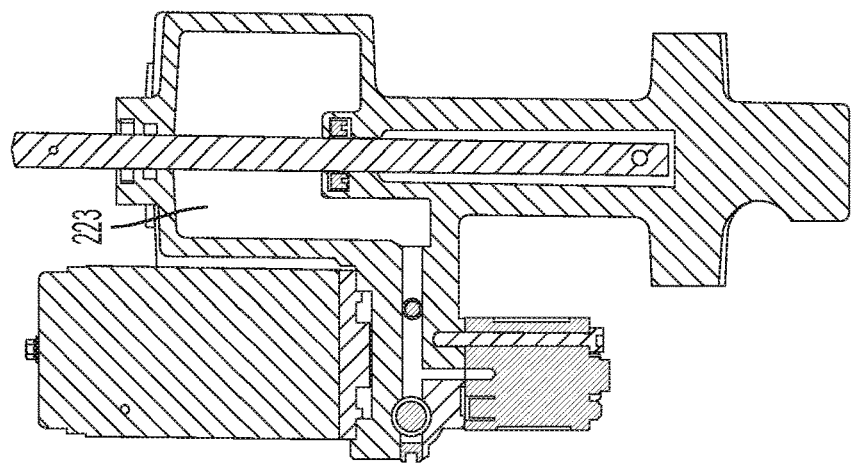
Figure 4F:
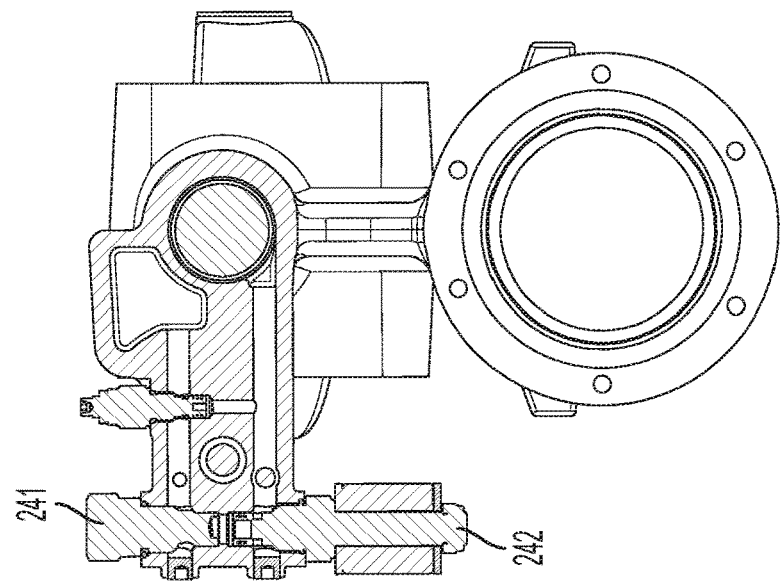
Figure 4E:
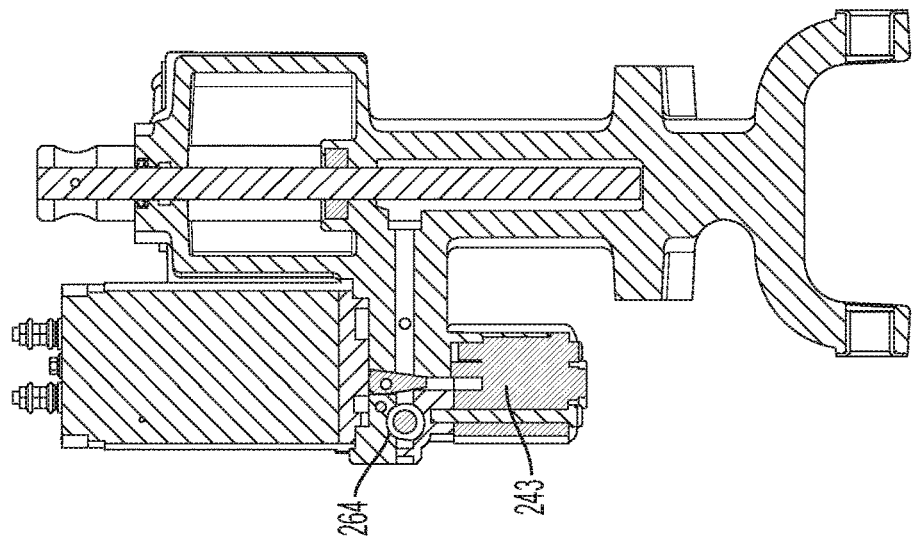

FIGS. 4E-4G illustrate load holding operations of the hydraulic actuator. Referring to FIG. 4E, when there is no demand to lift or lower the forks and a load must be held in the current positon, the none-return-valve 264 prevents flow of oil back through the pump 243. In addition, the lower control valve 271, shown in FIG. 4F, is closed to prevent the flow of oil back to the reservoir as shown in FIG. 4G.

Lowering

Figure 4J:
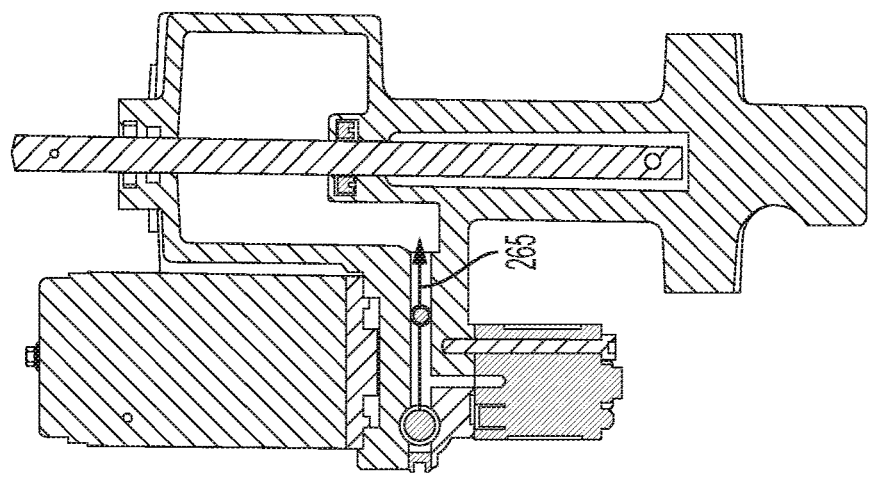
Figure 4I:
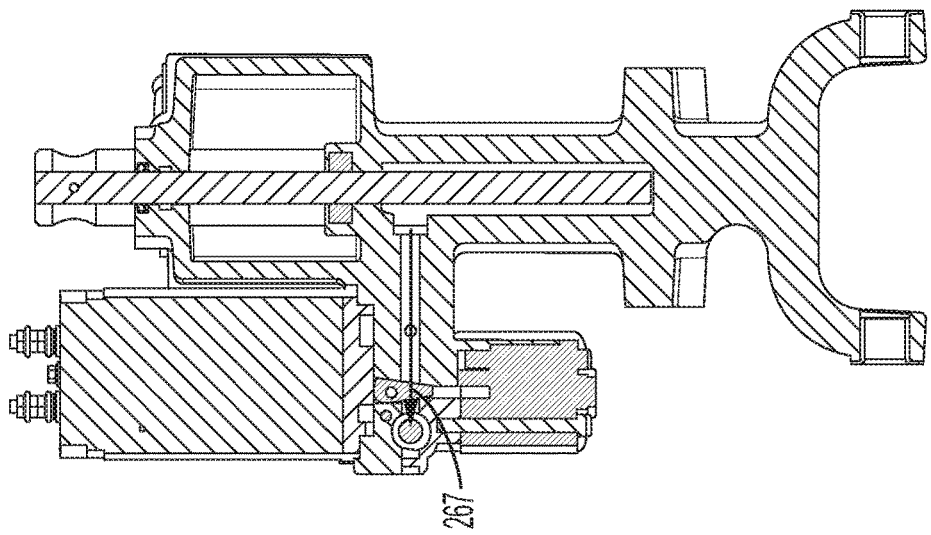
Figure 4H:
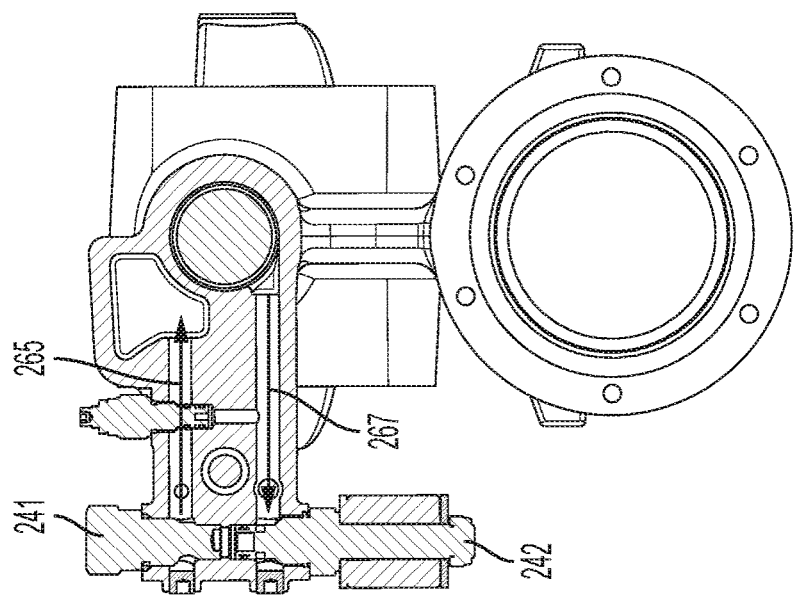

FIGS. 4H-4J illustrate lowering operations of the hydraulic actuator. Referring to FIG. 4H, upon a command to lower, lower control valve 271 is caused to allow pressure to be released from the lift chamber as shown in FIG. 4I and to flow along gallery 267, through the valve 242 and into flow control valve 241 as shown in FIG. 4H. The flow control valve 241 may be of the pressure compensated type, thus allowing a fixed flow rate. This results in a fixed lowering speed regardless of payload. The flow then returns to the fluid reservoir through gallery 265 as shown in FIG. 4J. Maximum lowering is achieved when the piston contacts the housing to prevent over-lowering.

As described above, some previous approaches include a hydraulic system that consists of a separate mounting frame, a separate hydraulic power unit consisting of a motor pump and a valve block, and a separate cylinder connected by a hose. In contrast, as described herein, the hydraulic actuator 220 may be formed as a casting that is constructed such that it has an internal fluid reservoir 223 and forms the housing for all the hydraulic components, such as the cylinder rod 237, the cylinder seals and bearings 263, the fill port 245, the lift motor 239, the pump 243 and the valves 241. The casting also forms a structure that supports the fork frame 207, the rear support frame 211, the steering tiller 215, the traction motor 241, and the lift linkage 249. By combining all elements into one housing, cost, assembly time and part count are significantly reduced. Further, by integrating oil galleries into the casting external hoses are not required and the risk of leakage is considerably reduced.

It will be apparent to those skilled in the art that various modifications and variations can be made in the disclosed embodiments of the disclosed device and associated methods without departing from the spirit or scope of the disclosure. Thus, it is intended that the present disclosure covers the modifications and variations of the embodiments disclosed above provided that the modifications and variations come within the scope of any claims and their equivalents.

What is claimed is:

1. A housing for a hydraulic actuator unit of a pallet truck, comprising:
 a lift motor mount for mounting a lift motor and pump of the hydraulic actuator unit to the housing;
 a pump mount for mounting a hydraulic pump of the hydraulic actuator unit to the housing, wherein the hydraulic pump is coupled to the lift motor when the lift motor is mounted to the lift motor mount and the hydraulic pump is mounted to the pump mount;
 a hydraulic cylinder to receive a cylinder rod, wherein the cylinder rod is positioned based on an amount of fluid within the hydraulic cylinder;
 a fluid reservoir to store fluid for actuation of the cylinder rod, wherein the housing has one or more fluid galleries that extend, internal to the housing, among the fluid reservoir, the pump mount, and the hydraulic cylinder; and
 a traction motor mount for mounting a traction motor, wherein the traction motor is coupled to a steering unit of the pallet truck and controls actuation of a traction wheel of the pallet truck when the traction motor is mounted to the traction motor mount;
 wherein the lift motor mount, the pump mount, the hydraulic cylinder, the fluid reservoir, and the traction motor mount are elements of a unitary physical structure.

2. The housing of claim 1, further comprising a support frame mount, the support frame mount to mount the housing to a support frame of the pallet truck to form a frame of the pallet truck.

3. The housing of claim 1, wherein the traction motor mount includes steer bearing mounts for mounting steer bearings to the housing, wherein the steer bearings allow at least a portion of the steering unit to be rotated relative to the housing while the traction motor mount maintains a position of the traction motor relative to the housing.

4. The housing of claim 1, wherein the housing is a casting with at least a portion of the one or more fluid galleries formed during a casting process of the housing.

5. The housing of claim 1, wherein the housing further comprises a lift linkage mount for connecting a lift linkage to the housing.

6. The housing of claim 1, further comprising valve mounts for a non-return valve, a lower valve, and a pressure relief valve located along the one or more fluid galleries.

7. A hydraulic actuator unit for a pallet truck, comprising:
 a housing to couple the hydraulic actuator unit to a support frame of the pallet truck, wherein the housing is a unitary physical structure that includes a fluid reservoir, a lift motor mount, a pump mount, a traction motor mount, and a hydraulic cylinder;
 a cylinder rod that extends into the hydraulic cylinder, wherein a position of the cylinder rod depends on an amount of fluid located within the hydraulic cylinder;
 a lift motor mounted to the lift motor mount of the housing;
 a hydraulic pump mounted to the pump mount of the housing and coupled to the lift motor, wherein the lift motor controls actuation of the hydraulic pump, and wherein the housing has one or more fluid galleries that extend, internal to the housing, among the fluid reservoir, the hydraulic pump, and the hydraulic cylinder, the hydraulic pump to transmit fluid from the fluid reservoir to the hydraulic cylinder via at least a portion of the one or more fluid galleries when the hydraulic pump is actuated; and
 a traction motor mounted to the traction motor mount of the housing over a drive aperture of the housing, wherein a portion of a steering unit of the pallet truck extends within the drive aperture when the hydraulic unit is coupled to the pallet truck and engages with the traction motor, the traction motor to control actuation of a traction wheel of the steering unit.

8. The hydraulic actuator unit of claim 7, wherein the housing is further to couple to a lift linkage of the pallet truck, wherein the housing, the support frame, and the lift linkage of the pallet truck forms a frame of the pallet truck.

9. The hydraulic actuator unit of claim 8, wherein the housing has a lift linkage aperture that is to receive a portion of the lift linkage to couple the housing to the lift linkage.

10. The hydraulic actuator unit of claim 7, further comprising steer bearings mounted to sidewalls encircling the drive aperture, the steer bearings to engage with the portion of the steering unit and allow the steering unit to rotate relative to the housing while a position of the traction motor is maintained relative to the housing.

11. The hydraulic actuator unit of claim 7, wherein the cylinder rod is to couple to a fork frame of the pallet truck and the cylinder rod is to lift and lower the fork frame based on the position of the cylinder rod.

12. The hydraulic actuator unit of claim 7, further comprising one or more valves to control flow of fluid through the one or more fluid galleries.

13. The hydraulic actuator unit of claim 12, wherein the one or more valves includes a non-return valve coupled to a first fluid gallery of the one or more fluid galleries, a lower valve coupled to a second fluid gallery of the one or more fluid galleries, and a pressure relief valve coupled to a third fluid gallery of the one or more fluid galleries, wherein the first fluid gallery extends between the hydraulic pump and the hydraulic cylinder, the second fluid gallery extends between the hydraulic cylinder and the fluid reservoir, and the third fluid gallery extends between the hydraulic cylinder and the fluid reservoir.

14. The hydraulic actuator unit of claim 7, wherein the cylinder rod is located between the steering unit and a fork frame of the pallet truck, and wherein the lift motor and the hydraulic pump are located to a side of the cylinder rod between the steering unit and the fork frame.

15. A pallet truck, comprising:
- a steering unit that includes a traction wheel of the pallet truck;
- a fork frame that includes a pair of forks configured to engage with a pallet; and
- a frame coupled to the steering unit, wherein the frame includes:
  - a hydraulic actuator unit that includes:
    - a housing that is a unitary physical structure that includes a fluid reservoir, a lift motor mount, a pump mount, a traction motor mount, and a hydraulic cylinder;
    - a cylinder rod that extends into the hydraulic cylinder and is coupled to the fork frame, wherein a position of the cylinder rod depends on an amount of fluid located within the hydraulic cylinder, and wherein the position of the cylinder rod controls a vertical position of the fork frame;
    - a lift motor mounted to the lift motor mount of the housing;
    - a hydraulic pump mounted to the pump mount of the housing and coupled to the lift motor, wherein the housing has one or more fluid galleries that extend, internal to the housing, among the fluid reservoir, the hydraulic pump, and the hydraulic cylinder; and
    - a traction motor mounted to the traction motor mount of the housing,
    - wherein the traction motor is coupled to the steering unit and controls actuation of the traction wheel; and
  - lift linkage coupled to the hydraulic actuator unit, where the lift linkage extends beneath the fork frame.

16. The pallet truck of claim 15, wherein the frame further includes a support frame coupled to the housing, wherein the support frame extends away from the fork frame and provides stability for the pallet truck.

17. The pallet truck of claim 15, wherein the hydraulic actuator unit further includes steer bearings to engage with the steering unit, and wherein the steer bearings allow the steering unit to rotate while the traction motor remains static.

18. The pallet truck of claim 17, wherein the steering unit includes a steer arm that facilitates rotation of the steering unit.

19. The pallet truck of claim 15, wherein the hydraulic actuator unit further includes one or more valves coupled to the housing, wherein the one or more values control flow of fluid among the fluid reservoir, the hydraulic pump, and the hydraulic cylinder via the one or more fluid galleries.

20. The pallet truck of claim 15, wherein the cylinder rod is located between the steering unit and the fork frame, and wherein the lift motor and the hydraulic pump are located to a side of the cylinder rod between the steering unit and the fork frame.

* * * * *